(12) United States Patent
Jordan et al.

(10) Patent No.: US 7,729,277 B2
(45) Date of Patent: Jun. 1, 2010

(54) USE OF INTELLIGENT DIRECTED BROADCAST IN CONTACT CENTER SOLUTIONS

(75) Inventors: Kenneth D. Jordan, Groton, MA (US);
Lawrence Johnson, Sudbury, MA (US);
Kevin Collins, Roseville, CA (US);
Michael P. Lepore, Marlborough, MA (US); Paul Schechinger, Londonderry, NH (US)

(73) Assignee: Cisco Technology, Inc., San Jose, CA (US)

( * ) Notice: Subject to any disclaimer, the term of this patent is extended or adjusted under 35 U.S.C. 154(b) by 592 days.

(21) Appl. No.: 11/711,960

(22) Filed: Feb. 28, 2007

(65) Prior Publication Data

US 2008/0205428 A1 Aug. 28, 2008

(51) Int. Cl.
*H04J 1/16* (2006.01)
*H04J 3/16* (2006.01)

(52) U.S. Cl. .................................. 370/252; 370/468

(58) Field of Classification Search .............. 370/252, 370/468
See application file for complete search history.

(56) References Cited

U.S. PATENT DOCUMENTS

| 5,754,639 | A  | * | 5/1998  | Flockhart et al. ....... 379/266.05 |
| 5,978,465 | A  |   | 11/1999 | Corduroy et al.                    |
| 6,058,163 | A  | * | 5/2000  | Pattison et al. ......... 379/265.06 |
| 6,088,442 | A  | * | 7/2000  | Chavez et al. .......... 379/265.03 |
| 6,744,858 | B1 | * | 6/2004  | Ryan et al. ..................... 379/45 |
| 7,023,979 | B1 | * | 4/2006  | Wu et al. ............... 379/265.11 |
| 7,039,176 | B2 |   | 5/2006  | Borodow et al.                     |
| 2005/0238157 | A1 |  | 10/2005 | Shaffer et al.                     |
| 2006/0026049 | A1 |  | 2/2006  | Joseph et al.                      |
| 2006/0031540 | A1 | * | 2/2006 | Purontaus et al. ........... 709/229 |
| 2006/0123060 | A1 |  | 6/2006  | Allen et al.                       |
| 2007/0036331 | A1 | * | 2/2007 | Fitzgerald ............. 379/265.02 |
| 2008/0123832 | A1 | * | 5/2008 | Pines et al. ............ 379/218.02 |
| 2009/0210524 | A1 | * | 8/2009 | McCormack et al. ....... 709/223  |

* cited by examiner

*Primary Examiner*—Andrew Lee
(74) *Attorney, Agent, or Firm*—Michael C. Stephens, Jr.; Trellis IP Law Group, PC

(57) ABSTRACT

In one embodiment, a method can include: (i) receiving a new contact in a contact center, where the new contact includes an expressed need; (ii) forming a resource set in response to the expressed need of the new contact, where the resource set includes one or more prospective resources; and (iii) sending a broadcast message to each of the prospective resources in the resource set.

20 Claims, 4 Drawing Sheets

USE OF INTELLIGENT DIRECTED BROADCAST IN CONTACT CENTER SOLUTIONS

TECHNICAL FIELD

The present disclosure relates generally to contact centers, and the use of directed broadcasts therewith.

BACKGROUND

Contact centers are typically used to send a call (e.g., a single voice media) to a particular agent or resource. In most contact centers, a call may be sent to a single agent, and that agent must either answer the call, or "time out" (e.g., when that agent is not available). For a time out situation, the call may be re-queued, and then sent to a next available agent.

When applying such a conventional contact center approach to "knowledge" workers, such as those who may not be required to rigorously answer calls like typical agents, this approach can lead to long wait times. Worse yet, when using technologies, such as presence from instant messaging (IM) clients to report a state of potential resources to the contact center, input data may be flawed or stale, thus creating an undesirable user experience.

DESCRIPTION OF EXAMPLE EMBODIMENTS

Overview

In one embodiment, a method can include: (i) receiving a new contact in a contact center, where the new contact includes an expressed need; (ii) forming a resource set in response to the expressed need of the new contact, where the resource set includes one or more prospective resources; and (iii) sending a broadcast message to each of the prospective resources in the resource set.

In one embodiment, an apparatus can include: (i) an input of a contact center, where the input can receive a new contact having an expressed need; (ii) logic configured to form a resource set in response to the expressed need of the new contact, where the resource set includes one or more prospective resources; and (iii) logic configured to send a broadcast message to each of the prospective resources in the resource set.

Example Embodiments

In particular embodiments, a contact center may choose a set of potential resources from a set of all available resources that could potentially satisfy expressed needs of a given contact. The contact center may simultaneously offer the contact's "request for help" to all of the resources in this set. Further, this request for help may not be limited to voice or a single media, but can encompass any suitable form of communication (e.g., chat or instant messaging (IM), e-mail, voice, collaborative, etc.). Each of these resources can then choose to accept or reject the contact.

In particular embodiments, a targeted set of prospective resources from an overall resource pool may be based on an intelligent algorithm, and the request may be broadcast to these prospective resources simultaneously. Then, particular embodiments provide the ability to take responses from those resources and order or prioritize them based on selection criteria (e.g., a first answer, or prioritization schemes involving other than strictly a first answer).

Figure 1:
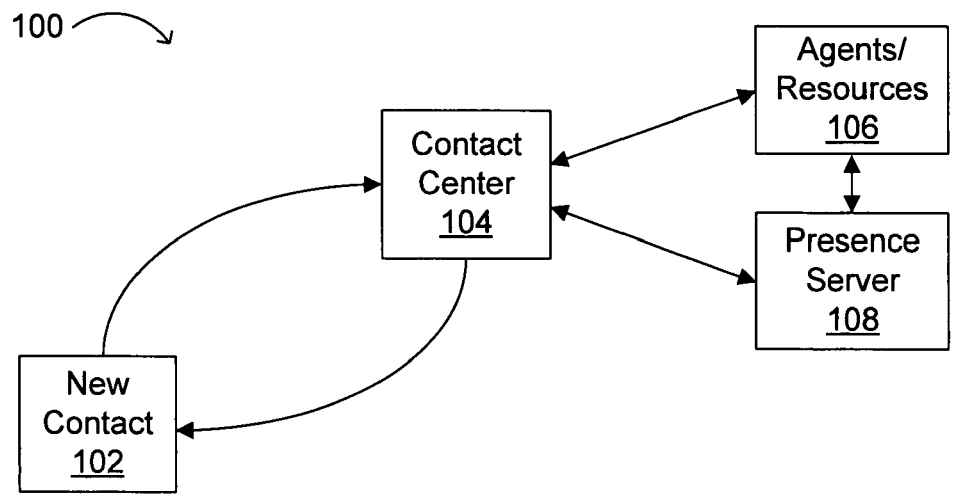
FIG. 1 illustrates an example contact center system.

Referring now to FIG. 1, an example contact center system is indicated by the general reference character 100. New contact 102 can reach contact center 104, and may express certain needs thereto. In response, contact center 104 can arrange for one or more of agents/resources 106 to satisfy the needs of the new contact. In addition, resources 106 can include actual people (e.g., agents), and/or may include automated processes. Such automated processes can include text-to-speech (TTS), as well as automatic speech recognition, engines, as well as customer-specified logic designed to respond to the expressed needs of a new contact.

A contact's needs may be described or expressed as a set of "needed" or desired skills and/or attributes. Such skills and/or attributes associated with a particular queue may be the sum or aggregate of those skills and/or attributes for the agents assigned to that queue, for example. In addition, presence server 108 can be coupled to agents/resources 106 to provide presence indications or a state of potential resources to contact center 104.

Figure 2:
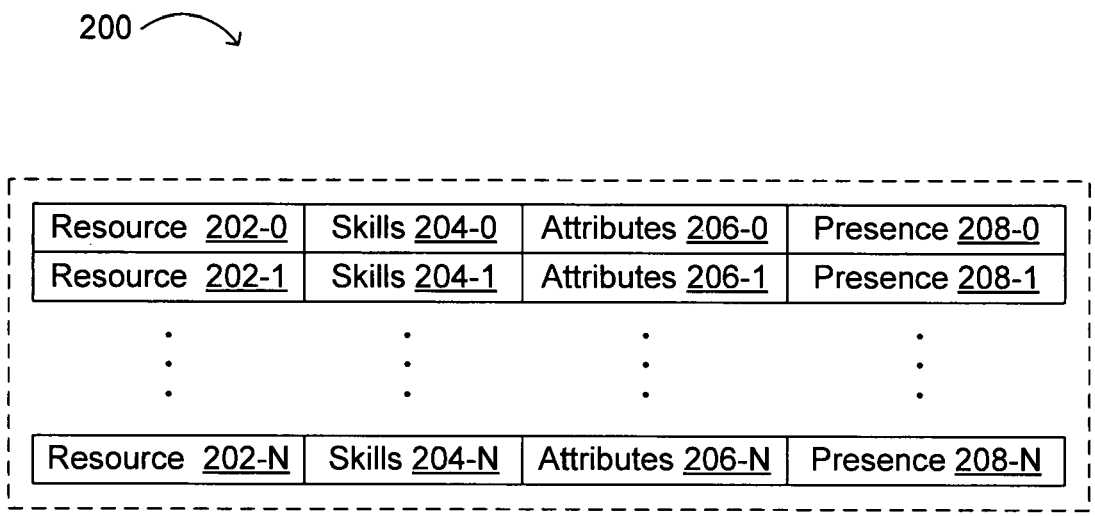
FIG. 2 illustrates an example of predetermined matching characteristics used in determining a resource set.

Referring now to FIG. 2, an example of predetermined matching characteristics that may be used in determining a resource set is indicated by the general reference character 200. Each resource can have certain fields coupled thereto in order to facilitate a search for matching particular predetermined characteristics to fulfill expressed contact needs. For example, resource 202-0 can have skills 204-0, attributes 206-0, and a presence indication 208-0. Skills may generally be configured in a static fashion, while attributes can be either static or dynamic. Presence indications can include availability information in any number of communications media and/or devices (e.g., text, voice, Web, etc.). Similarly, resource 202-1 can have skills 204-1, attributes 206-1, and a presence indication 208-1, and so on through resource 202-N with skills 204-N, attributes 206-N, and presence indication 208-N. Of course, additional fields or fewer fields can be used, depending on the particular application.

Figure 3:
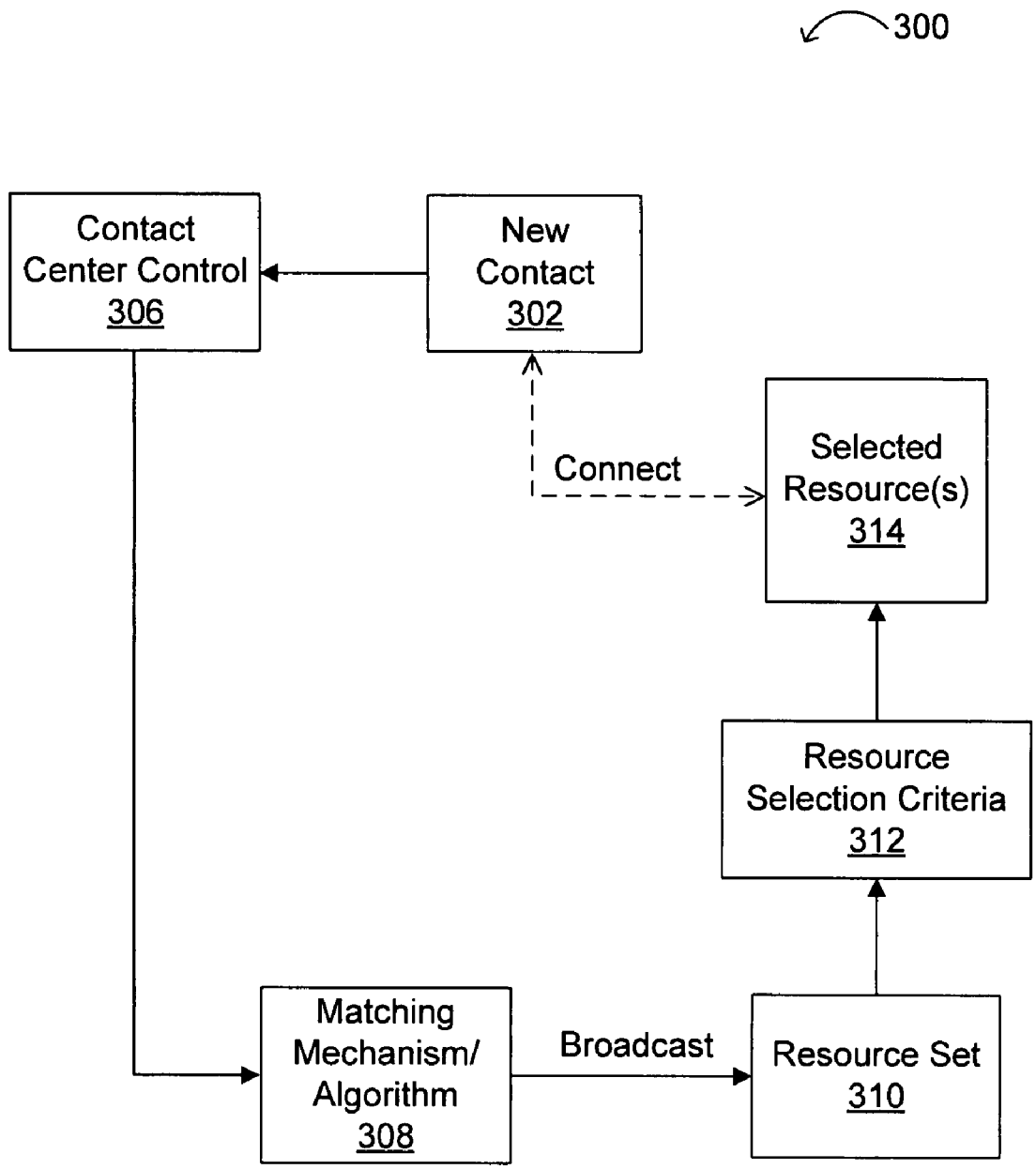
FIG. 3 illustrates an example contact center block diagram for an intelligent directed broadcast flow.

Referring now to FIG. 3, an example contact center block diagram for an intelligent directed broadcast flow is indicated by the general reference character 300. New contact 302 can reach contact center control 306, perhaps via a new contact queue. An example contact center can support functions including control 306, matching mechanism/algorithm 308, resource set 310, resource selection criteria 312, and one or more selected resources 314. Contact center control 306 can be coupled to matching mechanism/algorithm 308 such that the needs of new contact 302 can be matched against a potential set of resources. Further, new contact 302 can be in any communications medium (e.g., via a telephone call, a video conference, a text message, etc.).

Matching mechanism/algorithm 308 can include performing comparisons with predetermined characteristics (e.g., skills, attributes, etc.), and can include real-time or historic agent performance data, to find an appropriate set of resources/agents, as discussed above. Once a suitable set of resources is identified, a broadcast message can be sent to each prospective resource in the resource set (310). Such a broadcast message can be in any suitable media (e.g., audio, video, text, etc.) and/or may utilize an application layer, and can convey an "offered task" to each such resource. Further, the broadcast message can include information that a prospective resource can use in making a decision to accept or reject an offered task.

In particular embodiments, resources within the resource set can respond by accepting, rejecting, or ignoring the offered task from the broadcast message. Accepting resources can be provided to resource selection criteria 312 to determine a selected resource 314. Alternatively, a group of selected resources (e.g., a minimized group or set), as opposed to a single selected resource, can be provided by resource selection criteria 312. In this fashion, selected resource 314 can be allowed to establish a connection with new contact 302. Such a connection or media stream can be in any suitable media, particularly a communications media preferred by the new contact. For example, new contact 302 may specify a request to have a text dialogue to address an expressed need, so selected resource (or group of selected resources) 314 can initiate a text messaging session with new contact 302. Further, such a media stream for a connection between a contact and a resource may not be established until after the selected resource (e.g., 314) is determined in particular embodiments.

In addition, resource set 310 can include resources that may not typically be included in a standard contact center system. For example, knowledge-based workers whose employment incentives are not tied directly to answering particular calls can also be included in the resource set in particular embodiments. To facilitate this feature, any type of communications media, with associated presence information or the like, can be utilized via a matching mechanism/algorithm 308 to form resource set 310.

In particular embodiments, the selection criteria (e.g., 312) can include simply choosing a first resource that accepts the contact, and the others in the resource set may be notified that they are no longer needed. In this approach, a specified or predetermined subset of the accepting resources may also be indicated to restrict those that can be selected via first response. Alternatively, the system may wait up to a maximum or predetermined period of time to collect accepting responses, and then rank those responses based on some other criteria (e.g., distance, skill level, or a query to an external program to rank the resources) in order to find the best resource out of those who have responded.

In particular embodiments, a resource that was offered a task to perform some computation (e.g., based on the offered task), and return the computed data to the contact center, where such a computational result may then be used to determine which resource ultimately should receive the task. Accordingly, an overall computational power of the contact center matching engine can be extended to include all of the endpoints in the contact center as well.

In this fashion, contact centers in particular embodiments may be allowed to offer multimedia requests to more than a single resource at substantially a same time, and then resolve which resource receives that contact based on a variety of factors, including the response to the offer. Accordingly, an overall time to answer may be reduced, and contact center technology may be extended and applied to non-contact center applications (e.g., those involving knowledge-based workers).

Figure 4:
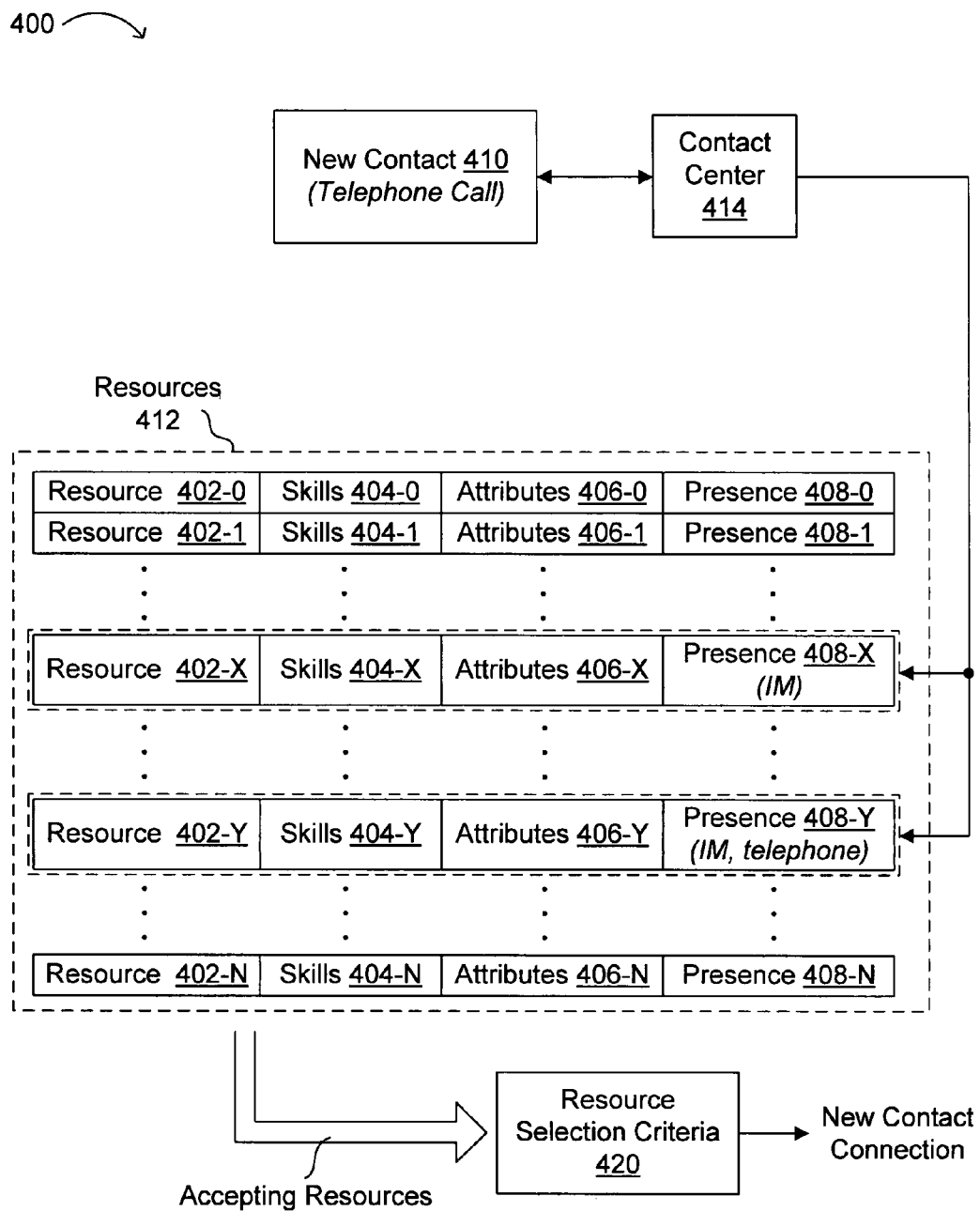
FIG. 4 illustrates an example resource selection flow.

Referring now to FIG. 4, another example resource selection flow is indicated by the general reference character 400. In this particular example, new contact 410 may express needs via a telephone call to contact center 414. Then, contact center 414 can activate a matching algorithm including accessing a database of information on resources 412.

Resources 412 can include resource 402-0 with skills 404-0, attributes 406-0, and a presence indication 408-0. Similarly, resource 402-1 can have skills 404-1, attributes 406-1, and a presence indication 408-1, so on through resource 402-X with skills 404-X, attributes 406-X, and presence indication 408-X, so on through resource 402-Y with skills 404-Y, attributes 406-Y, and presence indication 408-Y, and so on through resource 402-N with skills 404-N, attributes 406-N, and presence indication 408-N.

As shown in this particular example, resource 402-X can have a presence indication showing availability via text or IM, while resource 402-Y can have a presence indication showing availability via IM or telephone. In this example, resources 402-X and 402-Y can be selected by the matching algorithm to form a set of perspective resources to address expressed needs of new contact 410. Of course, a set of more than two agents or resources may be suitable for addressing expressed contact needs in other examples.

If resources 402-X and/or 402-Y are interested and accept (i.e., accepting resources) the offered task broadcasted, resource selection criteria 420 can be applied to determine which of 402-X and/or 402-Y is to be utilized for the new contact connection. As discussed above, selection criteria can include a first resource to respond in the affirmative or accept the offered task. Alternatively, any other suitable priority system can be applied to determine a winning resource, such as one involving waiting a predetermined period of time to allow other perspective resources to respond.

Particular embodiments can take advantage of application layer intelligence to target a subset of the overall potential resources, as opposed to all configured resources. Further, since a broadcast can occur at the application layer, the call may not need to be moved until the final resource is identified. Thus, non-Internet protocol (IP) environments can be accommodated in particular embodiments. In addition, particular embodiments can provide any knowledge of the contact that the contact center has with the offered task so that a targeted resource can make an informed decision as to accepting or rejecting the task.

Particular embodiments can allow for extending an offered task to a dynamically created set of resources, which can change over time (e.g., per contact) based on any number of external conditions. Also, a resource may evaluate and decide if it wants to accept the contact before connecting to the media stream, in order to save on bandwidth and media resources. Further, particular embodiments can allow the resource to provide information back to a centralized intelligence solution or work assigner. Particular embodiments can also utilize a centralized (e.g., enterprise-wide) intelligent decision-making component to make a final decision on which resource may be given the contact based on information the resources provide after evaluating the task offer.

Figure 5:
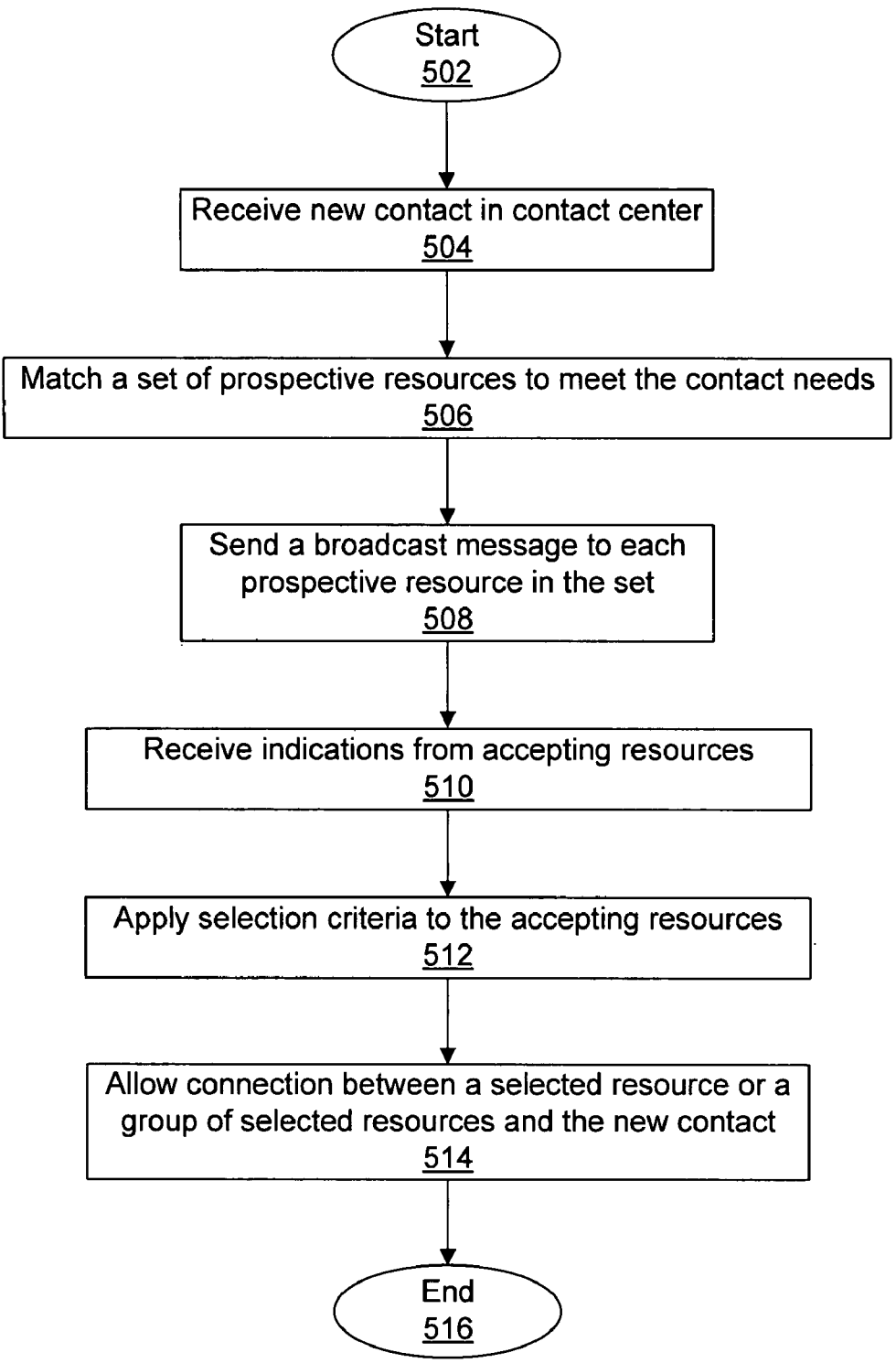
FIG. 5 illustrates a simplified flow chart of an example method of utilizing directed broadcasts.

Referring now to FIG. 5, a simplified flow chart of an example method of directing broadcasts is indicated by the general reference character 500. The flow can begin (502) and a new contact can be received via a contact center (504). Next, a matching algorithm can be activated to match a set of prospective resources with the skills and/or attributes to satisfy expressed new contact needs (506).

Once a resource set is formed by finding one or more matches, a broadcast can be sent (e.g., using an application layer) to the perspective resources within the resource set (508). Indications can then be received from the accepting resources (510). Then, selection criteria can be applied to the accepting resources to determine a resource, or a ranking of resources, for servicing the needs of the new contact (512). In some embodiments, a group of selected resources, such as a minimized set or group of resources, can be provided. Next, a connection, or other suitable tangible result, can be allowed between the selected resource or the group of selected resources and the new contact (514), and the flow can complete (516).

Although the description has been described with respect to particular embodiments thereof, these particular embodiments are merely illustrative, and not restrictive. Thus, although contact centers are primarily described herein, it will be understood that other types of matching and/or resource allocation may be appreciated by persons skilled in the art. For example, any type of matching algorithm amenable to selection of one or more resources for a resource set, and broadcasting to resources in that set, can be accommodated in accordance with particular embodiments. Further, agents, or other general types of resources (e.g., automated processes, or any "intelligent" endpoint) can be employed in accordance with particular embodiments. For example, text-to-speech (TTS) and/or automatic speech recognition engines, as well as any customer-specified logic designed to respond to the expressed needs of a new contact, can be utilized in accordance with particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
   receiving a new contact in a contact center, the new contact having an expressed need to be satisfied by a resource that is associated with the contact center;
   forming a resource set in response to the expressed need of the new contact, the resource set having one or more prospective resources;
   sending a broadcast message to each of the prospective resources in the resource set;
   determining accepting resources based on responses from among the prospective resources that received the broadcast message; and
   applying selection criteria to the accepting resources to select the resource for satisfaction of the expressed need by allowing connection to the new contact.

2. The method of claim 1, wherein the determining the accepting resources from the resource set comprises waiting up to a predetermined period of time after the broadcast message is sent.

3. The method of claim 1, wherein the applying selection criteria to the accepting resources comprises selecting the accepting resources when only a single resource from among the prospective resources responds.

4. The method of claim 1, wherein the applying the selection criteria comprises selecting a first to respond from among at least a subset of the accepting resources.

5. The method of claim 1, wherein the applying the selection criteria comprises applying a ranking to each of the accepting resources.

6. The method of claim 1, further comprising connecting a group of selected resources from the accepting resources to the new contact.

7. The method of claim 1, further comprising forming the connection between the selected resource and the new contact.

8. The method of claim 1, wherein the sending the broadcast message comprises using an application layer to simultaneously send the broadcast message to each of the prospective resources.

9. The method of claim 1, wherein the broadcast message comprises information usable by the prospective resources in making decisions to accept or reject an offered task to satisfy the expressed need of the new contact.

10. The method of claim 1, further comprising receiving one or more computational results from the prospective resources, wherein:
    the one or more computational results are in response to an offered task related to the expressed need of the new contact; and
    the selection criteria uses the one or more computational results to select the resource to satisfy the expressed need of the new contact.

11. An apparatus, comprising:
    a processor; and
    logic encoded in one or more tangible media for execution by the processor, and when executed operable to:
       receive a new contact in a contact center, the new contact having an expressed need to be satisfied by a resource that is associated with the contact center;
       form a resource set in response to the expressed need of the new contact, the resource set having one or more prospective resources;
       send a broadcast message to each of the prospective resources in the resource set;
       determine accepting resources based on responses from among the prospective resources that received the broadcast message; and
       apply selection criteria to the accepting resources to select the resource for satisfaction of the expressed need by allowing connection to the new contact.

12. The apparatus of claim 11, wherein the logic operable to determine the accepting resources from the resource set comprises waiting up to a predetermined period of time after the broadcast message is sent.

13. The apparatus of claim 11, wherein the logic operable to apply selection criteria to the accepting resources comprises logic operable to select the accepting resources when only a single resource from among the prospective resources responds.

14. The apparatus of claim 11, wherein the logic when executed that is operable to apply the selection criteria comprises logic operable to select a first to respond from among at least a subset of the accepting resources.

15. The apparatus of claim 11, wherein the logic when executed that is operable to apply the selection criteria comprises logic operable to apply a ranking to each of the accepting resources.

16. The apparatus of claim 11, wherein the logic when executed is further operable to form the connection between the a selected resource and the new contact.

17. The apparatus of claim 11, wherein the broadcast message is configured to use an application layer to simultaneously send the broadcast message to each of the prospective resources.

18. The apparatus of claim 11, wherein the broadcast message comprises information usable by the prospective resources in making decisions to accept or reject an offered task to satisfy the expressed need of the new contact.

19. The apparatus of claim 11, wherein the logic when executed is further operable to receive one or more computational results from the prospective resources, wherein:
    the one or more computational results are in response to an offered task related to the expressed need of the new contact; and
    the selection criteria is configured to use the one or more computational results to select the resource to satisfy the expressed need of the new contact.

20. A system for directing broadcasts for contacts the system comprising:
    means for receiving a new contact in a contact center, the new contact having an expressed need to be satisfied by a resource that is associated with the contact center;

means for forming a resource set in response to the expressed need of the new contact, the resource set having one or more prospective resources;

means for sending a broadcast message to each of the prospective resources in the resource set;

means for determining accepting resources based on responses from among the prospective resources that received the broadcast message; and means for applying selection criteria to the accepting resources to select the resource for satisfaction of the expressed need by allowing connection to the new contact.

\* \* \* \* \*